United States Patent [19]
Okubo

[11] Patent Number: 5,392,137
[45] Date of Patent: Feb. 21, 1995

[54] IMAGE PROCESSING APPARATUS IN WHICH FILTERING IS SELECTED FOR INPUT IMAGE CHARACTERISTICS

[75] Inventor: Hiromi Okubo, Yokohama, Japan

[73] Assignee: Ricoh Company, Ltd., Tokyo, Japan

[21] Appl. No.: 53,205

[22] Filed: Apr. 28, 1993

[30] Foreign Application Priority Data
Apr. 30, 1992 [JP] Japan .................. 4-111644

[51] Int. Cl.6 ............................................. H04N 1/40
[52] U.S. Cl. ................... 358/462; 358/448; 382/54
[58] Field of Search ............... 358/443, 448, 454, 455, 358/456, 462, 464; 382/54, 55

[56] References Cited
U.S. PATENT DOCUMENTS

| | | | |
|---|---|---|---|
| 4,855,933 | 8/1989 | Kondo | 382/55 |
| 5,134,667 | 7/1992 | Suzuki | 382/54 |
| 5,166,810 | 11/1992 | Sorimachi et al. | 358/462 |
| 5,231,677 | 7/1993 | Mita et al. | 358/462 |

*Primary Examiner*—Edward L. Coles, Sr.
*Assistant Examiner*—Thomas D. Lee
*Attorney, Agent, or Firm*—Popham, Haik, Schnobrich & Kaufman, Ltd.

[57] ABSTRACT

An image processing apparatus includes a reading part for optically reading an input image signal from an original document, a first filtering part for outputting a first image signal by processing the input image signal through an edge sharpening filter, a second filtering part for outputting a second image signal by processing the input image signal through a smoothing filter, a detecting part for detecting an edge quantity of the input image signal, a correcting part for outputting a first edge quantity by correcting the edge quantity, a mixing part for mixing two image signals from among the input image signal, the first image signal, and the second image signal in accordance with a mixing factor so that an image signal obtained by the mixing is output to a recording unit, and a mixing control part for determining the mixing factor in response to the first edge quantity output from the correcting part, and for supplying the mixing factor to the mixing part.

7 Claims, 15 Drawing Sheets

F I G. 3

M1

| -1 | 0 | 1 |
|----|---|---|
| -1 | 0 | 1 |
| -1 | 0 | 1 |

F I G. 4

M1

| -1 | -1 | -1 |
|----|----|----|
| 0  | 0  | 0  |
| 1  | 1  | 1  |

| 1 | 1 | 1 | 1 | 1 |

| 1 | 0 | 1 | 0 | 1 |

SUB SCANNING DIRECTION

UPPER BLOCK
SAMPLE BLOCK
LOWER BLOCK

→ MAIN SCANNING DIRECTION

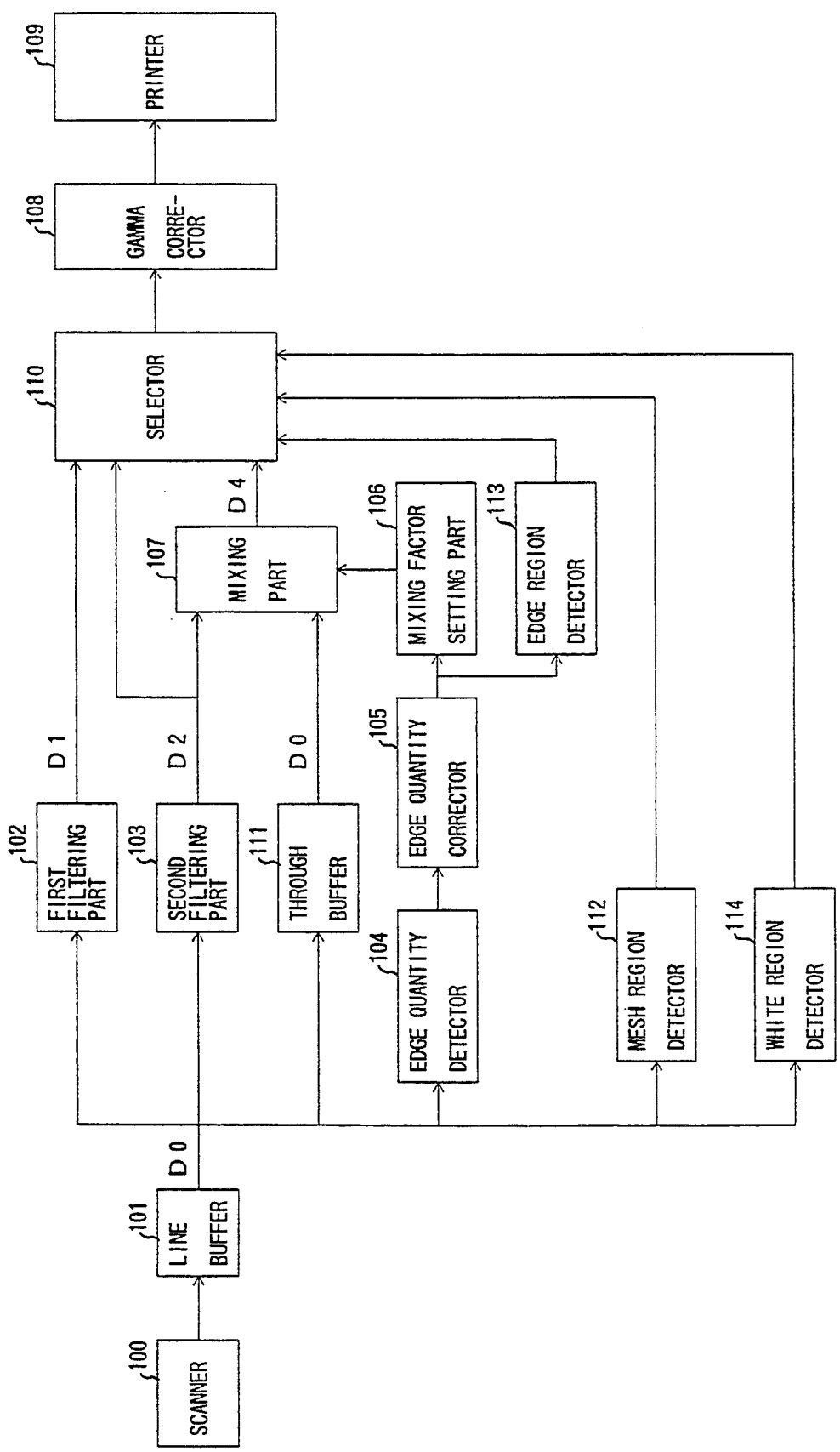

F I G. 1 3

| MESH REGION DETECTION | EDGE REGION DETECTION | WHITE REGION DETECTION | OUTPUT OF SELECTOR |
|---|---|---|---|
| ON | ON | — | D 4 |
| ON | OFF | — | D 2 |
| OFF | ON | ON | D 1 |
| OFF | ON | OFF | D 4 |
| OFF | OFF | — | D 2 |

FIG. 16

| -1 | -1 | -1 | -1 | -1 |
|----|----|----|----|----|
| 0  | 0  | 0  | 0  | 0  |
| 1  | 1  | 1  | 1  | 1  |

FIG. 17

| -1 | 0 | 1 |
|----|---|---|
| -1 | 0 | 1 |
| -1 | 0 | 1 |
| -1 | 0 | 1 |
| -1 | 0 | 1 |

FIG. 18A

| 0 | -1 | 0 |
|---|----|---|
| -1 | +5 | -1 |
| 0 | -1 | 0 |

FIG. 18B

| 1/9 | 1/9 | 1/9 |
|-----|-----|-----|
| 1/9 | 1/9 | 1/9 |
| 1/9 | 1/9 | 1/9 |

FIG. 18C

| 1 | -8 | 1 |
|---|----|---|
| -8 | 46 | -8 |
| 1 | -8 | 1 |

$\times \dfrac{1}{18}$

IMAGE PROCESSING APPARATUS IN WHICH FILTERING IS SELECTED FOR INPUT IMAGE CHARACTERISTICS

BACKGROUND OF THE INVENTION

The present invention generally relates to an image processing apparatus, and more particularly to an image processing apparatus in which a digital image is produced by carrying out an image processing appropriate for the characteristics of an input image supplied from a scanner, so that the digital image is output from a printer. This apparatus can be applied to digital copiers, facsimile machines or the like.

In digital copiers or the like, it is desirable to reproduce a high quality digital image from an input image supplied from a scanner no matter what the characteristics of the original image are. In order to reproduce a high quality digital image by means of a printer, it is necessary to select an image processing (or filtering) appropriate for the input image and to produce the digital image by carrying out the image processing for the input image. With the recent development of digital image processing technology, it has become possible to reproduce a very fine image at a quality level compatible with the quality level of the analog image processing without the need for expensive hardware.

However, there are some problems in the digital image processing. Generally, input images to be processed by an image processing apparatus are classified into character images, continuous-tone images (photographic images) and mesh images (printed matters). When a mesh image is processed through a filtering process, an image reproduced from such an input image may have moire due to interference of the sampling intervals and the dot intervals. When a composite image in which a mesh image and a character image coexist is processed, the reproduced image may have undesired dots in a character region and the edges of characters may become faded.

There is a known method for eliminating the above mentioned problems. In this method, it is detected whether a pixel of the input image constitutes a part of a mesh image or a part of a character image before a digital signal processed through a filtering process for the pixel is output to the printer. When the pixel is detected to be in a mesh region, an image signal processed through a smoothing filter is selected, and the signal is output to the printer. When the pixel is detected to be in a character region (also called an edge region), an image signal processed through an edge sharpening filter is selected, and the signal is output to the printer.

However, the type of the filtering process used by the above mentioned method is fixed regardless of the characteristics of the input image. When a composite image in which a character image and a mesh image coexist is processed, it is likely that the edges reproduced from the mesh image will become excessively sharp and the edges reproduced from the character image will become imperceptible due to the filtering process type which is inappropriate for the input image.

There is another method for eliminating the previously mentioned problems. In this method, an edge quantity of each pixel is detected by an edge quantity detector, and, when the edge quantity falls in an intermediate range between the maximum limit and the minimum limit, an image signal processed for the pixel through a smoothing filter and an image signal processed for the pixel through an edge sharpening filter are mixed in accordance with a predetermined mixing factor so that the derived signal is output to the printer.

However, the intermediate range and the mixing factor used in the above mentioned method are preset and cannot be adjusted in accordance with the characteristics of the input image. If the intermediate range and the mixing factor are preset to values appropriate for processing a mesh image, the edges reproduced from a character image (especially, fine lines or edges of a small character) become faded. If the intermediate range and the mixing factor are preset to values appropriate for processing a character image, the edges reproduced from the mesh image become excessively sharp. Therefore, in the above conventional image processing method, it is difficult to reproduce an image with clear edges no matter what the characteristics of the input image are.

SUMMARY OF THE INVENTION

Accordingly, it is a general object of the present invention to provide an improved image processing apparatus in which the above described problems are eliminated.

Another, more specific object of the present invention is to provide an image processing apparatus which can reproduce an image having clear edges by using simple hardware, no matter what the characteristics of the input image are. Still another object of the present invention is to provide an image processing apparatus which can prevent fine lines in the main scanning direction or edges of small characters from becoming imperceptible due to filtering processes inappropriate for the characteristics of the input image being performed. The above mentioned objects of the present invention are achieved by an image processing apparatus which includes a reading part for optically reading an input image signal from an original document, a first filtering part for outputting a first image signal by processing the input image signal through an edge sharpening filter, a second filtering part for outputting a second image signal by processing the input image signal through a smoothing filter, a detecting part for detecting an edge quantity of the input image signal, a correcting part for outputting a first edge quantity by correcting the edge quantity detected by the detecting part, a mixing part for mixing two image signals from among the input image signal, the first image signal, and the second image signal in accordance with a mixing factor so that a third image signal obtained by the mixing is output to a recording unit, and a mixing control part for determining the mixing factor in response to the first edge quantity from the correcting part, and for supplying the mixing factor to the mixing part, whereby the recording unit reproduces an output image on a copy sheet in according with the third image signal output from the mixing part.

According to the present invention, it is possible to prevent the reproduced image from having excessively sharp edges when the pixel lies in a mesh region (or a continuous-tone region), and thus the edges of the reproduced image become only moderately sharp. Even when a composite image in which a mesh image (or a continuous-tone image) and a character image coexist is processed, the edges reproduced from the mesh image (or the continuous-tone image) become only moderately sharp while the edges reproduced from the character image have an ordinary degree of sharpness.

Other objects and further features of the present invention will become apparent from the following detailed description when read in conjunction with the accompanying drawings.

BRIEF DESCRIPTION OF THE DRAWINGS

FIGS. 3 and 4 are diagrams showing respective matrix coefficients of two differential filters used to detect an edge quantity of a pixel;

FIG. 11 is a block diagram showing a third embodiment of the image processing apparatus according to the present invention;

FIG. 13 is a diagram for explaining how a selector of the image processing apparatus shown in FIG. 11 selects one of three image signals;

FIGS. 16 and 17 are diagrams showing respective matrix coefficients of two differential filters used by an edge quantity corrector according to the present invention to detect the gradients of optical density; and FIGS. 18A through 18C are diagrams showing respective matrix coefficients of an edge sharpening filter and a smoothing filter respectively used by first and second filtering parts of the image processing apparatus.

DESCRIPTION OF THE PREFERRED EMBODIMENTS

Figure 1:
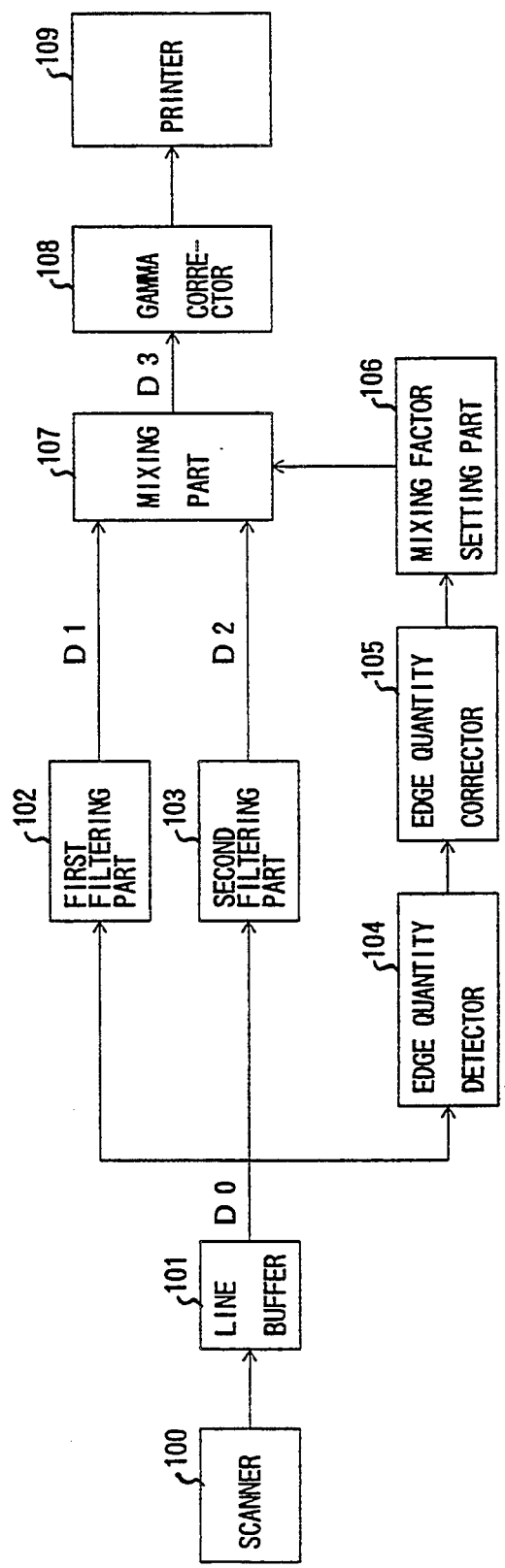
FIG. 1 is a block diagram showing a first embodiment of an image processing apparatus according to the present invention.

A description will be given of a first embodiment of an image processing apparatus according to the present invention. FIG. 1 shows the construction of a digital copier to which the first embodiment of the present invention is applied. A scanner 100 photoelectrically reads an input image from an original document. An analog signal indicating the original image is converted into a digital signal, and the digital signal is input to a line buffer 101. The line buffer 101 stores digital signals corresponding to a few lines of the input image read by the scanner 100, the lines including a current line having a target pixel, a line preceding the current line, and a line following the current line.

After receiving the image data D0 from the line buffer 101, a first filtering part 102 outputs a first image signal D1 by processing the image data D0 through an edge sharpening filter. After receiving the image data D0 from the line buffer 101, a second filtering part 103 outputs a second image signal D2 by processing the image data D0 through a smoothing filter. A mixing part 107 mixes the first image signal D1 of the first filtering part 102 and the second image signal D2 of the second filtering part 103 so that an image signal D3 is output by the mixing part 107.

An edge quantity detector 104 detects an edge quantity of the target pixel in the image data D0 from the line buffer 101. An edge quantity corrector 105 corrects the edge quantity detected by the edge quantity detector 104 when the edge quantity is in a prescribed range, and outputs a first edge quantity. A mixing factor setting part 106 sets a mixing factor in accordance with the output of the edge quantity corrector 105, and supplies the mixing factor to the mixing part 107 so that the image signal D3 is produced from the first image signal D1 and the second image signal D2 in accordance with the mixing factor, thus enabling an image appropriate for the input image to be output. A gamma corrector 108 performs a correcting process on the output of the mixing part 107 so that a distortion of the image due to the difference between the characteristics of the scanner 100 and those of a printer 109 is eliminated. The printer 109 prints an image onto a copy sheet in accordance with the image data output by the gamma corrector 108.

Because the edge quantity of the input image is corrected by the edge quantity corrector 105, the edge area of a reproduced image may grow from the edge area of the input image to a certain extent, and thus the reproduced image may have sharp edges. Because a correcting process on the output of the mixing part 107 is performed by the gamma corrector 108, the distortion of the image due to the difference between the characteristics of the scanner 100 and those of the printer 109 is eliminated. Thus, an image printed by the printer 107 in accordance with the image data of the gamma corrector 108 can suitably show the characteristics of the optical density of the original image.

Figures 3, 4:
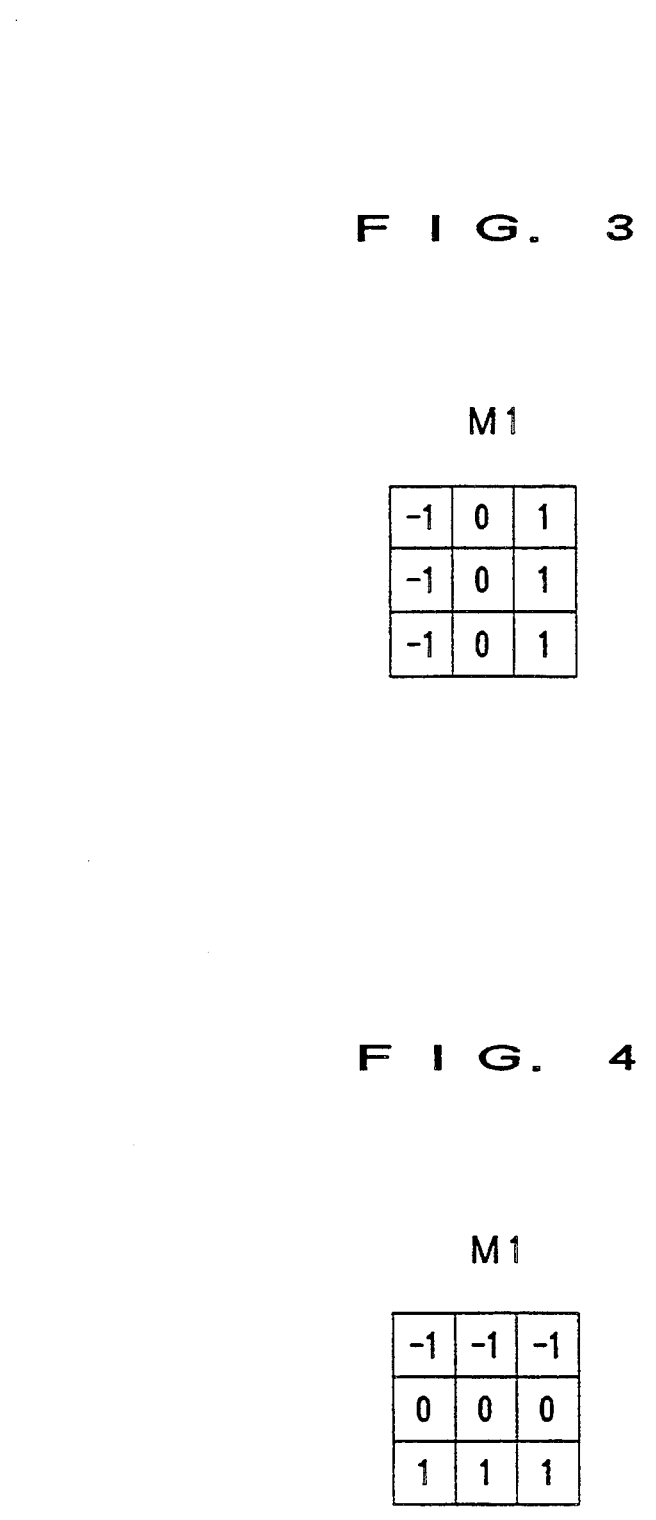

In the first embodiment shown in FIG. 1, two differential filters F1 and F2 with respect to the main and sub scanning directions are provided in the edge quantity detector 104 to detect the edge quantity of the input image. The filters F1 and F2 use 3×3 matrixes "M1" and "M2" shown in FIGS. 3 and 4, respectively. Each of the filters F1 and F2 includes nine coefficients arranged in a 3×3 formation.

An edge quantity "e1" with respect to the main scanning direction is derived by processing values of image data through the filter F1, and an edge quantity "e2" with respect to the sub scanning direction is derived by processing the values of the image data through the filter F2. The edge quantity "e1" is obtained, for example, by calculating ⅛ of the sum of nine products between the coefficients of the matrix M1 and the values of the image data D0 corresponding to the elements of the matrix M1. The target pixel of the image data D0 corresponds to the central element of the matrix M1.

Similarly, the edge quantity "e2" is obtained by calculating ⅑ of the sum of nine products between the coefficients of the matrix M2 and the values of the image data D0.

At the edge quantity detector 104, the edge quantity "e" of the target pixel is determined in accordance with the following equation.

$$e = [(e1)^2 + (e2)^2]^{\frac{1}{2}} \approx |e1| + |e2| \quad (1)$$

As in the equation (1), the approximation is used to determine the edge quantity "e" of the target pixel. More specifically, the sum of the absolute values of the edge quantities "e1" and "e2" mentioned above is calculated, and the value of the sum calculated according to the equation (1) is the edge quantity "e" detected by the edge quantity detector 104. The edge quantity detector 104 outputs a signal indicating the edge quantity "e" to the edge quantity corrector 105.

Figure 2:
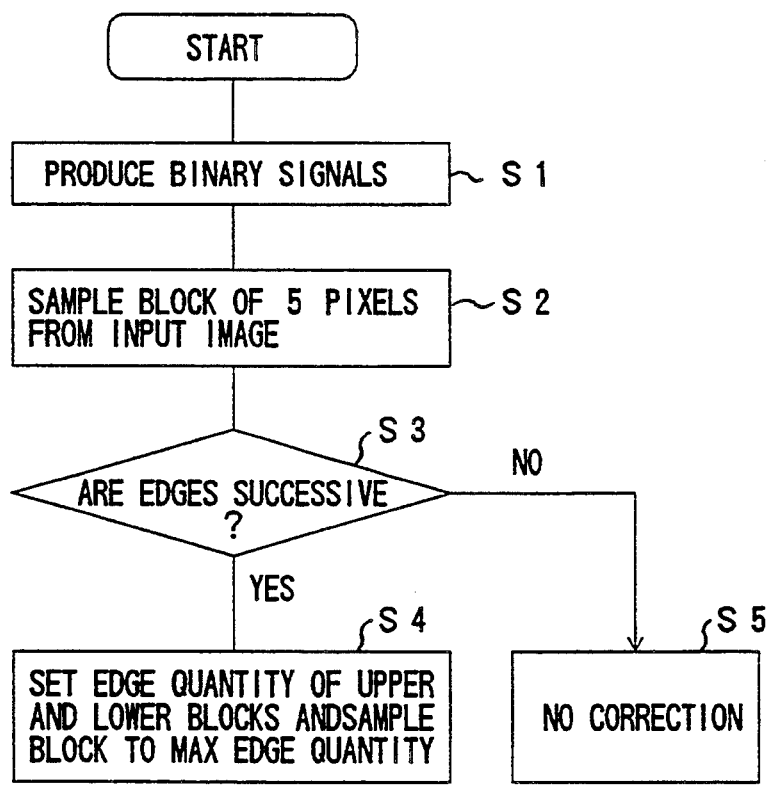
FIG. 2 is a flowchart for explaining an edge quantity correcting process performed by an edge quantity corrector of the image processing apparatus shown in FIG. 1.

Next, a description will be given of an edge quantity correcting process performed by the edge quantity corrector 105 of the apparatus shown in FIG. 1. FIG. 2 shows this edge quantity correction process. In step S1, the edge quantity "e" of the target pixel, which is supplied from the edge quantity detector 104, is binarized in the edge quantity corrector 105 by comparing the edge quantity "e" with a prescribed threshold value. A binary signal indicating whether or not the edge quantity is higher than the threshold value is obtained for each pixel of the input image. Each of the binary signals obtained is either an on-state signal (indicating the value "one" or a black dot) showing that the edge quantity is higher than the threshold value or an off-state signal (indicating the value "zero", or a white dot) showing that the edge quantity is lower than the threshold value. In step S2, a block of five pixels aligned along a main scanning line from the input image, which block has the target pixel in its center, is sampled.

Figures 6A, 6B, 7:
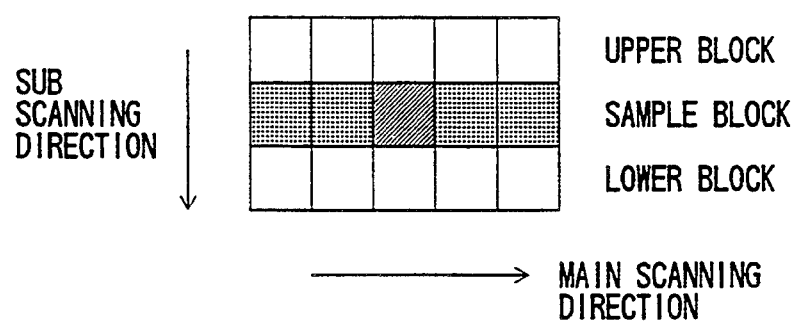
FIGS. 6A and 6B are diagrams showing examples of sample blocks in which the number of successive pixels indicating the value "one" is detected by the edge quantity correcting process shown in FIG. 2.
FIG. 7 is a diagram showing upper and lower blocks of image data contiguous to the sample block.

In step S3, it is detected by the edge quantity corrector 105 whether or not the number of successive pixels indicating the value "one" in the block is greater than three (e.g., four or five in a case where a block of five pixels is sampled). If the block has four or more successive pixels indicating the value "one", it is judged that the edges of the pixels of the block are successive to each other (as in the case of five on-state signals shown in FIG. 6A). If the block has three or less pixels indicating the value "one", it is judged that the edges of the pixels of the block are not successive to each other (as in the case shown in FIG. 6B wherein three on-state signals and two off-state signals are alternately arranged). If the edges of the pixels of the block are detected to be successive to each other, step S4 sets the edge quantity of the pixels of upper and lower blocks, contiguous to the sample block, to the maximum edge quantity (e.g., "255" for 8-bit image data), and sets the edge quantity of the pixels of the sample block to the maximum edge quantity by means of the edge quantity corrector 105. The setting of the pixels to the maximum edge quantity performed by means of the edge quantity corrector 105 is called correction of the edge quantity. The upper and lower blocks are contiguous to the sample block with respect to a direction perpendicular to the main scanning direction as shown in FIG. 7. If it is detected that the edges of the pixels are not successive to each other, step S5 performs no correction of the edge quantity. In other words, when the edges of the pixels are not successive, the edge quantities of the pixels of the upper and lower blocks are not changed (or are the same as detected by the edge quantity detector 104).

The mixing factor setting part 106 determines a mixing factor "me" (used by the mixing part 107 to mix the image signal D1 and the image signal D2) when the edge quantity "e", corrected by the edge quantity corrector 105, falls in a prescribed intermediate range between a lower limit "el" and an upper limit "eh". In accordance with the mixing factor "me" determined by the mixing factor setting part 106, the mixing part 107 produces an image signal D3, and supplies the signal D3 to the printer 109 via the gamma corrector 108. The image signal D3 is determined according to the equation: $D3 = me \times D1 + (1 - me) \times D2$.

Figure 5:
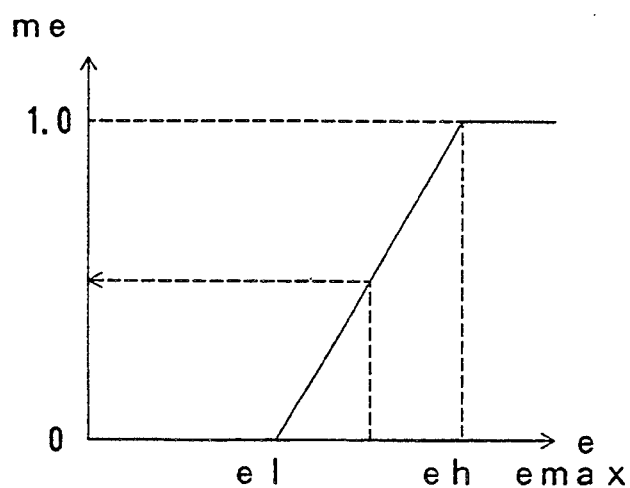
FIG. 5 is a chart showing a predetermined relationship between an edge quantity and a mixing factor according to the present invention.

FIG. 5 shows a predetermined relationship between the edge quantity and the mixing factor. This relationship is a linear characteristic between the edge quantity "e" and the mixing factor "me" as shown in FIG. 5. The mixing factor "me" is determined by the mixing factor setting part 106 based on the relationship shown in FIG. 5 when the edge quantity falls in the intermediate range, such that the mixing factor "me" has a value proportional to the edge quantity "e" output by the edge quantity corrector 105. The mixing factor "me" determined by the mixing factor setting part 106 is supplied to the mixing part 107.

When the edge quantity "e" output by the edge quantity corrector 105 is lower than the lower limit "el", the image signal D2 output by the second filtering part 103 is supplied to the printer 109 via the gamma corrector 108. When the edge quantity "e" output by the edge quantity corrector 105 is higher than the upper limit "eh", the image signal D1 output by the first filtering part 102 is supplied to the printer 109 via the gamma corrector 108.

In the first embodiment shown in FIG. 1, the first filtering part 102 uses an edge sharpening filter shown in FIG. 18A and the second filtering part 103 uses a smoothing filter shown in FIG. 18B. The two filters shown in FIGS. 18A and 18B are 3×3 matrixes each including nine coefficients arranged in a 3×3 formation. FIG. 18C shows a combined filter which is used by the mixing part 107 in a case wherein a mixing factor "me" equal to 0.5 is supplied to the mixing part 107. The filter shown in FIG. 18C is a matrix of nine predetermined coefficients arranged in a 3×3 formation, and each of the coefficients of the matrix is multiplied by a coefficient "1/18". In the case mentioned above, the image signal D3 (i.e., $D3 = 0.5 \times D1 + 0.5 \times D2$) output by the mixing part 107 becomes the same as the image signal derived when the input image D0 is processed through the filter shown in FIG. 18C.

In the first embodiment described above, it is detected whether the edges of the pixels of the sample block are successive to each other. If they are detected to be successive to each other, the edge quantities of the pixels of the upper and lower blocks are set to the maximum edge quantity, and the edge quantities of the pixels of the sample block are set to the maximum edge quantity, whereby the edges of the sample block grow to a certain extent. Thus, it is possible that the reproduced image of a small character or a fine line has clear edges.

However, in the first embodiment described above, there is a problem in that, when the input image is a mesh image, the reproduced image may have excessively sharp edges. Since a mixing factor when the mesh image is processed has an excessively great value, the image signal D3 output by the mixing part 107 is greatly influenced by the first image signal D1 of the first filtering part 102, whereby the reproduced image has excessively sharp edges.

Figure 8:
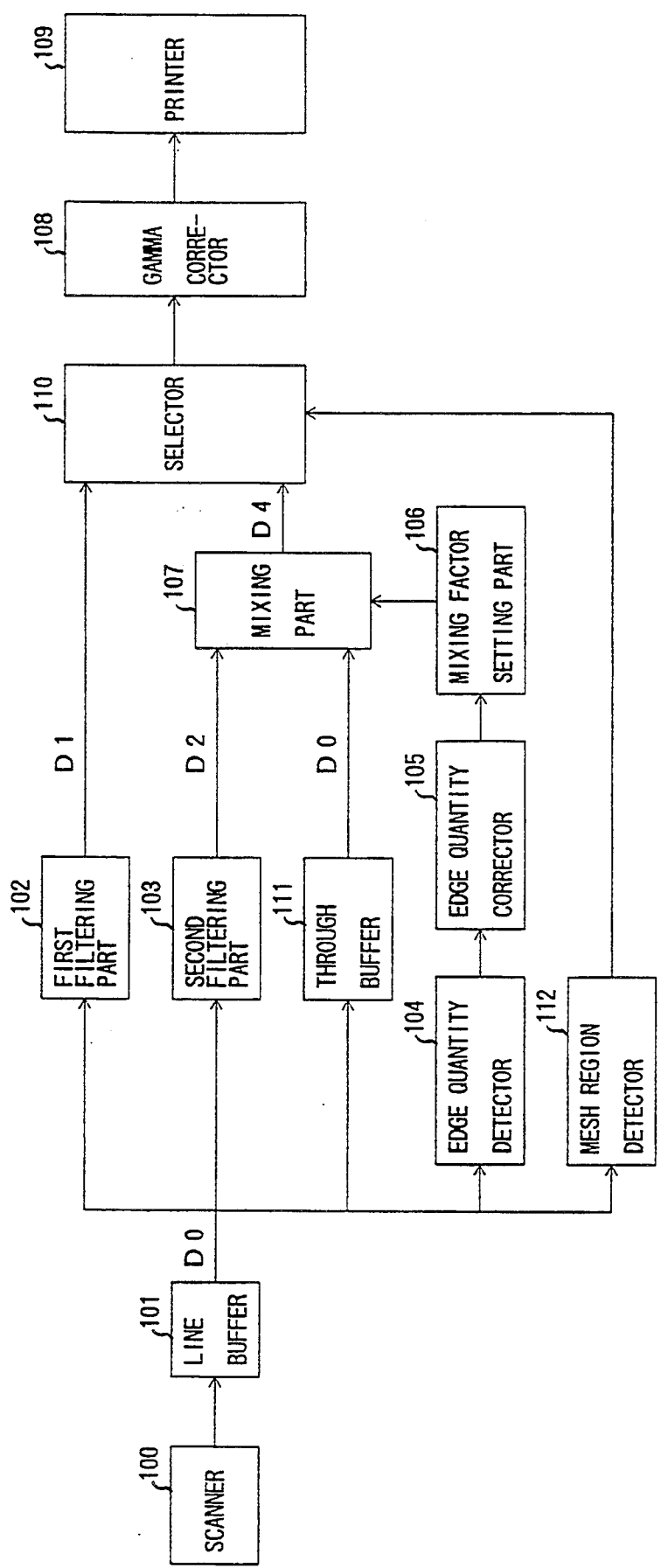
FIG. 8 is a block diagram showing a second embodiment of the image processing apparatus according to the present invention.

A second embodiment of the image processing apparatus according to the present invention has been proposed in order to eliminate the above mentioned problem of the first embodiment. FIG. 8 shows the construction of a digital copier to which the second embodiment of the present invention is applied. In FIG. 8, the parts which are the same as the corresponding parts shown in FIG. 1 are given the same reference numerals, and a description thereof will be omitted.

In the apparatus shown in FIG. 8, a selector 110 is provided between the mixing part 107 and the gamma corrector 108. The first image signal D1 output by the first filtering part 102 is supplied to the selector 110. A through buffer 111 is provided between the line buffer 101 and the mixing part 107. This buffer temporarily stores the image data Do supplied from the line buffer 101, and the image data D0 is supplied to the mixing part 107. The second image signal D2 output by the second filtering part 103 and the image data D0 output by the through buffer 111 are supplied to the mixing part 107 in synchronism with each other.

In the apparatus shown in FIG. 8, a mesh region detector 112 receives the image data Do supplied from the line buffer 101, and detects whether or not the pixel lies in a mesh region of the input image. The mesh region detector 112 supplies an on/off signal indicating whether the pixel lies in a mesh region to the selector 110. In accordance with the on/off signal supplied from the mesh region detector 112, the selector 110 selectively outputs the output signal of the first filtering part 102 (the first image signal D1) or the output signal of the mixing part 107 to the printer 109 via the gamma corrector 108.

Similar to the part 107 shown in FIG. 1, the mixing part 107 shown in FIG. 8 mixes the second image signal D2 of the second filtering part 103 and the image data D0 of the through buffer 111 in accordance with the mixing factor supplied from the mixing factor setting part 106, so that an image signal D4 derived by the mixing is output to the selector 110. The functions of the edge quantity detector 104, the edge quantity corrector 105, and the mixing factor setting part 106 in FIG. 8 are the same as those of the parts shown in FIG. 1.

More specifically, when an on-state signal supplied from the mesh region detector 112 and indicating that the pixel lies in a mesh region is received by the selector 110, the selector 110 outputs the image signal D4 of the mixing part 107 to the printer 109 via the gamma corrector 108. When an off-state signal supplied from the mesh region detector 112 and indicating that the pixel does not lie in a mesh region is received by the selector 110, the selector 110 outputs the first image signal D1 of the first filtering part 102 to the printer 109 via the gamma corrector 108. Since the printer 109 prints an image on a copy sheet in accordance with the image data output from the selector 110, it is possible to prevent the reproduced image from having excessively sharp edges in a mesh region. The image signal D4 is selected by the selector 110 for each of pixels in the mesh region, and then it is output to the printer 109. Thus, the edges of the image reproduced from the mesh image become only moderately sharp.

Figure 9:
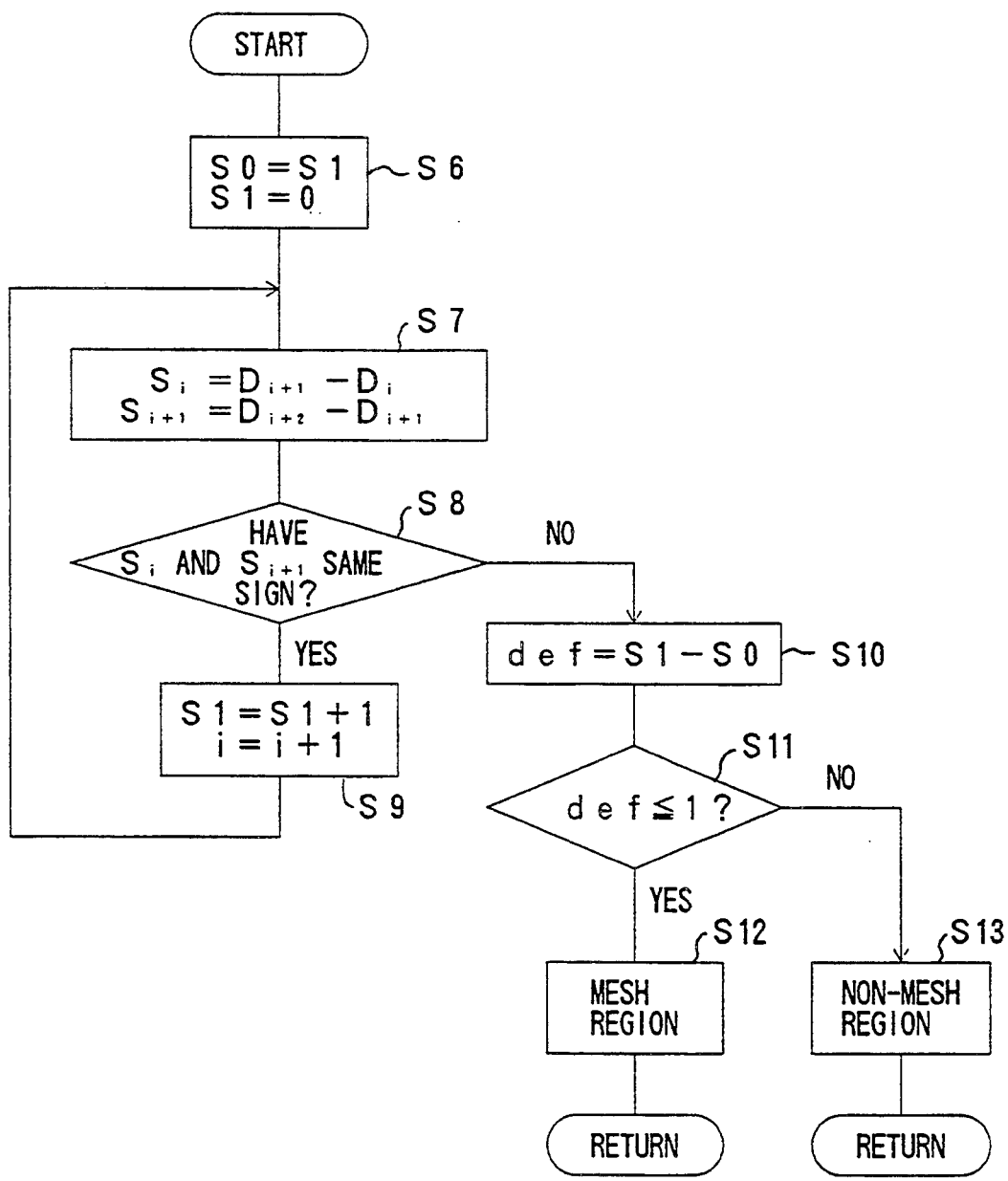
FIG. 9 is a flowchart for explaining a mesh region detecting process performed by a mesh region detector of the apparatus shown in FIG. 8.

FIG. 9 shows a mesh region detecting process performed by the mesh region detector 112 of the apparatus shown in FIG. 8. In step S6, a register S0 is set to the initial value of a counter S1, and the counter S1 is reset to zero. In step S7, a first difference Si between image data Di of the target pixel (the i-th pixel) and image data Di+1 of the contiguous pixel (the (i+1)-th pixel) (i.e., the pixel contiguous to the target pixel), and a second difference Si+1 between the image data Di+1 of the contiguous pixel and image data D+2 of another contiguous pixel (the (i+2)-th pixel) are calculated as Si=-Di+1−Di and Si+1=Di+2−Di+1, respectively. In step S8, it is detected whether or not the sign of the first difference Si is the same as the sign of the second difference.

If the differences Si and Si+1 are detected to have the same sign, step S9 increments the counter S1 (S1=S1+1) and increments the number "i" (i=i+1). The steps S7 and S8 are repeated until the answer to the step S8 is negative. If the differences Si and Si+1 are detected to have different signs, step S10 obtains the value of a difference counter "def" by calculating a difference between the register value "S0" and the counter value "S1" (def=S1−S0). The value of the difference counter "def" indicates the number of successive pixels having the same sign. In step S11, it is detected whether or not the difference counter "def" has a value of one or less. If the difference counter "def" is detected to have a value of one or less, step S12 outputs an on-state signal indicating that the target pixel lies in a mesh region. If the difference counter "def" is detected to have a value of two or greater, step S13 outputs an off-state signal indicating that the target pixel lies in a non-mesh region.

Figure 10A:
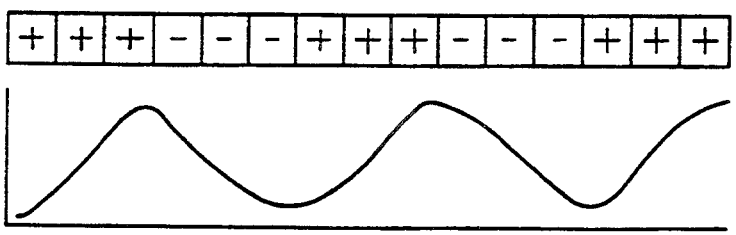
FIGS. 10A through 10C are diagrams showing respective changes of the signs of the differentials of three image data types used to detect a mesh region.
Figure 10B:
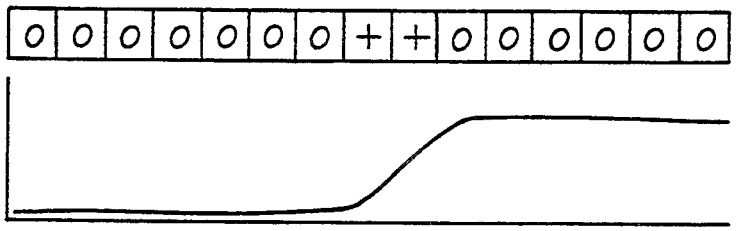
Figure 10C:
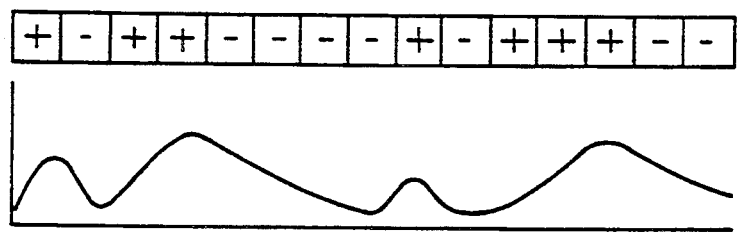

Generally, mesh images essentially consist of a plurality of small dots arranged at a given linear density (e.g., 150 lines per inch). In a profile of an input image read by the scanner 100 from a mesh image, the maximum intensity level and the minimum intensity level appear alternately at given intervals. FIG. 10A shows a profile of image data when a mesh image is read in the main scanning direction, together with the change of the sign of the differential of the image data. The sign of the differential denotes the gradient of the optical density of the image data. FIGS. 10B and 10C respectively show a profile of image data when a character image is read and a profile of image data when a continuous-tone image is read, together with the change of the sign of the differential of each image data. As shown in FIG. 10A, the sign of the differential of a mesh image or the gradient of the optical density of the image data periodically changes. According to the present invention, when the sign of the differential of the input image data periodically changes (or, the number of successive pixels having the same sign is smaller than two), the mesh region detector 112 detects that the target pixel lies in a mesh region of the image.

In the second embodiment described above, when the pixel is detected to lie in a mesh region the selector 110 supplies the image signal D4 (derived from the image signal D2 and the image signal D0) from the mixing part 107 to the printer 109. It is possible to prevent the reproduced image in a mesh region from having excessively sharp edges.

A third embodiment of the present invention has been proposed in which an image more appropriate than that of the second embodiment is reproduced when the input image is either an edge region or a white region. FIG. 11 shows the construction of a digital copier to which the third embodiment of the present invention is applied. In FIG. 11, the parts which are the same as the corresponding parts shown in FIG. 8 are given the same reference numerals, and a description thereof will be omitted.

In the apparatus shown in FIG. 11, an edge region detector 113 is provided between the edge quantity corrector 105 and the selector 110. The edge region detector 113 detects whether or not the pixel lies in an edge region of the input image in accordance with the edge quantity corrected by the edge quantity corrector 105. An on/off signal indicating whether or not the pixel lies in an edge region is supplied from the detector 113 to the selector 110.

A white region detector 114 is provided between the line buffer 101 and the selector 110. The white region detector 114 detects whether or not the pixel lies in a white region of the input image in accordance with the image signal Do from the line buffer 101. An on/off signal indicating whether or not the pixel lies in a white region is supplied from the detector 114 to the selector 110.

In the apparatus shown in FIG. 11, the selector 110 receives three detection signals from, respectively, the detectors 112, 113 and 114 for each pixel of the input image. In accordance with the combination of the three signals received by the selector 110, the selector 110 selects one of the first image signal D1 of the first filtering part 102, the second image signal D2 of the second filtering part 103, and the image signal D4 of the mixing part 107. The selected image signal is supplied from the selector 110 to the printer 109 via the gamma corrector 108.

FIG. 13 shows how the selector 110 selects one of the three image signals in accordance with the combination of the detection signals supplied from the three detectors. As shown in FIG. 13, when the pixel is located in an edge region and in a mesh region, the image signal D4 of the mixing part 107 is selected by the selector 110 for the pixel, the image signal D4 then being output to the printer 109. When the pixel is separate from an edge region but lies in a mesh region, the second image signal D2 of the second filtering part 103 is selected by the selector 110 for the pixel, the image signal D2 then being output to the printer 109. Therefore, it is possible to prevent the reproduced image from having excessively sharp edges in a mesh region, and thus the edges of the reproduced image become only moderately sharp.

The selection of one of the image signals when the pixel does not lie in a mesh region, that is when the input image is either a character image or a continuous-tone image will now be described with reference to FIG. 13. When it is detected that the pixel is located in an edge region and in a white region, the first image signal D1 of the first filtering part 102 is selected by the selector 110, the image signal D1 then being output to the printer 109. When it is detected that the pixel is located in an edge region but does not lie in a white region, the image signal D4 of the mixing part 107 is selected by the selector 110, the image signal D4 then being output to the printer 109. When it is detected that the pixel is not located in an edge region, the second image signal D2 of the second filtering part 103 is selected by the selector 110, the image signal D2 then being output to the printer 109. Therefore, it is possible to prevent the reproduced image from having inappropriate edges when the input image is a continuous-tone image, and edges of the reproduced image become smooth. In addition, when the input image is a character image, it is possible to prevent fine lines along the main scanning direction or edges of small characters from becoming imperceptible, so that the outlines of such characters or lines become clear.

Next, an edge region detecting process performed by the edge region detector 113 of the apparatus shown in FIG. 11 will be described. The edge quantity of the pixel, which is supplied from the edge quantity corrector 105 after it is corrected, is binarized through comparison of the edge quantity with a prescribed threshold value. The edge quantity corrector 105 obtains from each pixel an on-state signal indicating the value of one (showing that the edge quantity is higher than the threshold value), or an off-state signal indicating the value of zero (showing that the edge quantity is lower than the threshold value). A block of 5×5 pixels (or, k×k pixels in general cases) having the target pixel in the center thereof from the input image is sampled. Then, the number of pixels indicated by the on-state signals among twenty-five pixels of the block is calculated. If the calculated number is greater than a prescribed value, it is judged that the target pixel in the center of the block lies in an edge region. If the calculated number is not greater than the prescribed value, it is judged that the target pixel does not lie in an edge region.

Figure 12:
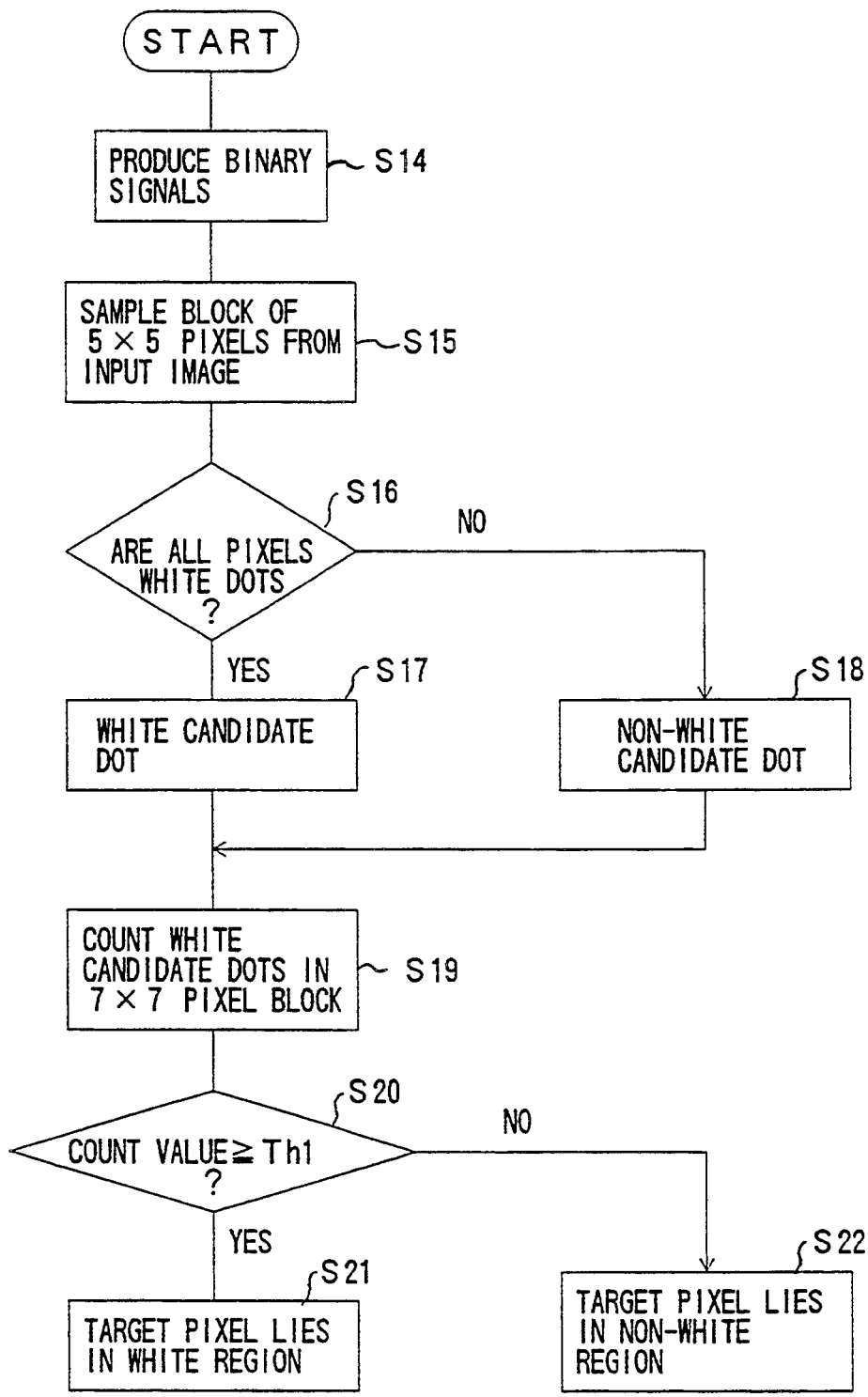
FIG. 12 is a flowchart for explaining a white region detecting process performed by a white region detector of the image processing apparatus shown in FIG. 11.

Next, a description will be given of a white region detecting process performed by the white region detector 114 of the apparatus shown in FIG. 11. FIG. 12 shows the white region detecting process which is performed in order to detect whether or not the pixel lies in a white region (or a white background of the original image). In step S14, the edge quantity of the pixel, which is the image data D0 supplied from the line buffer 101, is binarized through comparison of the edge quantity with the threshold value. A binary signal indicating whether or not the edge quantity is higher than the threshold value is obtained for each pixel. In step S15, a block of 5×5 pixels having the target pixel in the center thereof from the input image is sampled, and the number of pixels indicated by the on-state binary signals in the block is counted. Step S16 detects whether or not all the pixels of the block are indicated by the on-state binary signals (or, white dots). If the answer to the step S16 is affirmative, step S17 sets the target pixel to a white candidate dot. If the answer to the step S16 is negative, step S18 sets the target pixel to a non-white candidate dot.

In step S19, the number of white candidate dots in a block of 7×7 pixels having the target pixel in the center thereof is counted. In step S20, it is detected whether or not the number of white candidate dots in the 7×7 pixel block is greater than a prescribed threshold value Th1. If the answer to the step S20 is affirmative, step S21 judges that the target pixel lies in a white region. If the answer to the step S20 is negative, step S22 judges that the target pixel lies in a non-white region.

Figure 14:
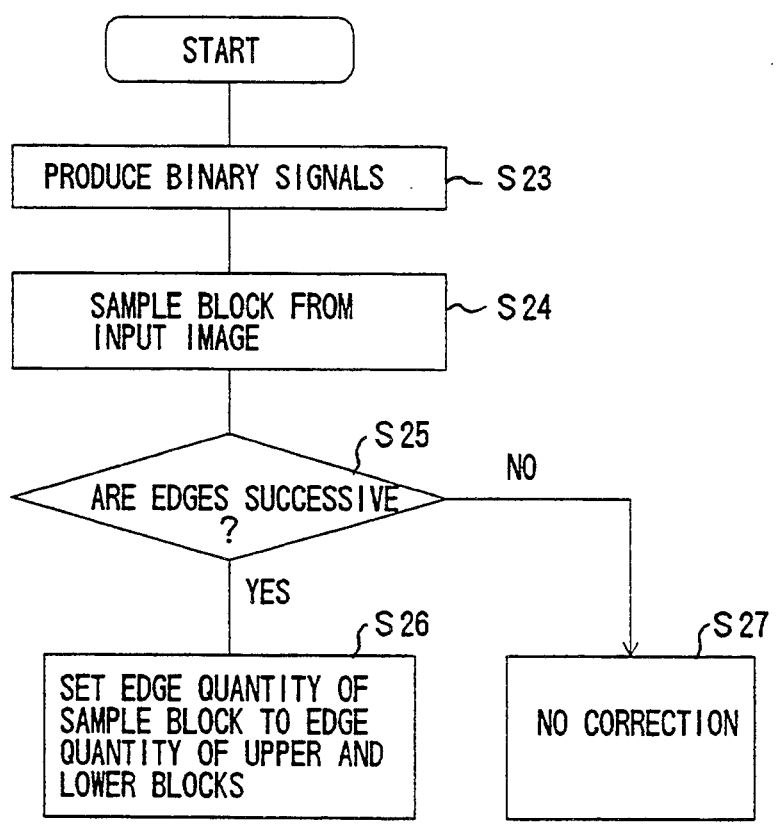
FIGS. 14 and 15 are flowcharts for explaining modified edge quantity correcting processes performed by the image processing apparatus according to the present invention.

FIG. 14 shows a modified edge quantity correcting process which is different from the edge quantity correcting process shown in FIG. 2. In FIG. 14, steps S23–S25 and S27 of the edge quantity correcting process are the same as the corresponding steps shown in FIG. 2. If the answer to step S25 is negative, step S27 does not correct the edge quantity. If the answer to step S25 is affirmative, step S26 sets the edge quantity of each of pixels of the sample block to the edge quantity of each of pixels of the upper and lower blocks, contiguous to the sample block. Thus, the pixels of the upper and lower blocks have edge quantities which are the same as those of the pixels of the sample block including the target pixel. The gradient of optical density of the reproduced image can moderately change in an edge region after the edge quantity correcting process shown in FIG. 14 is performed.

Figure 15:
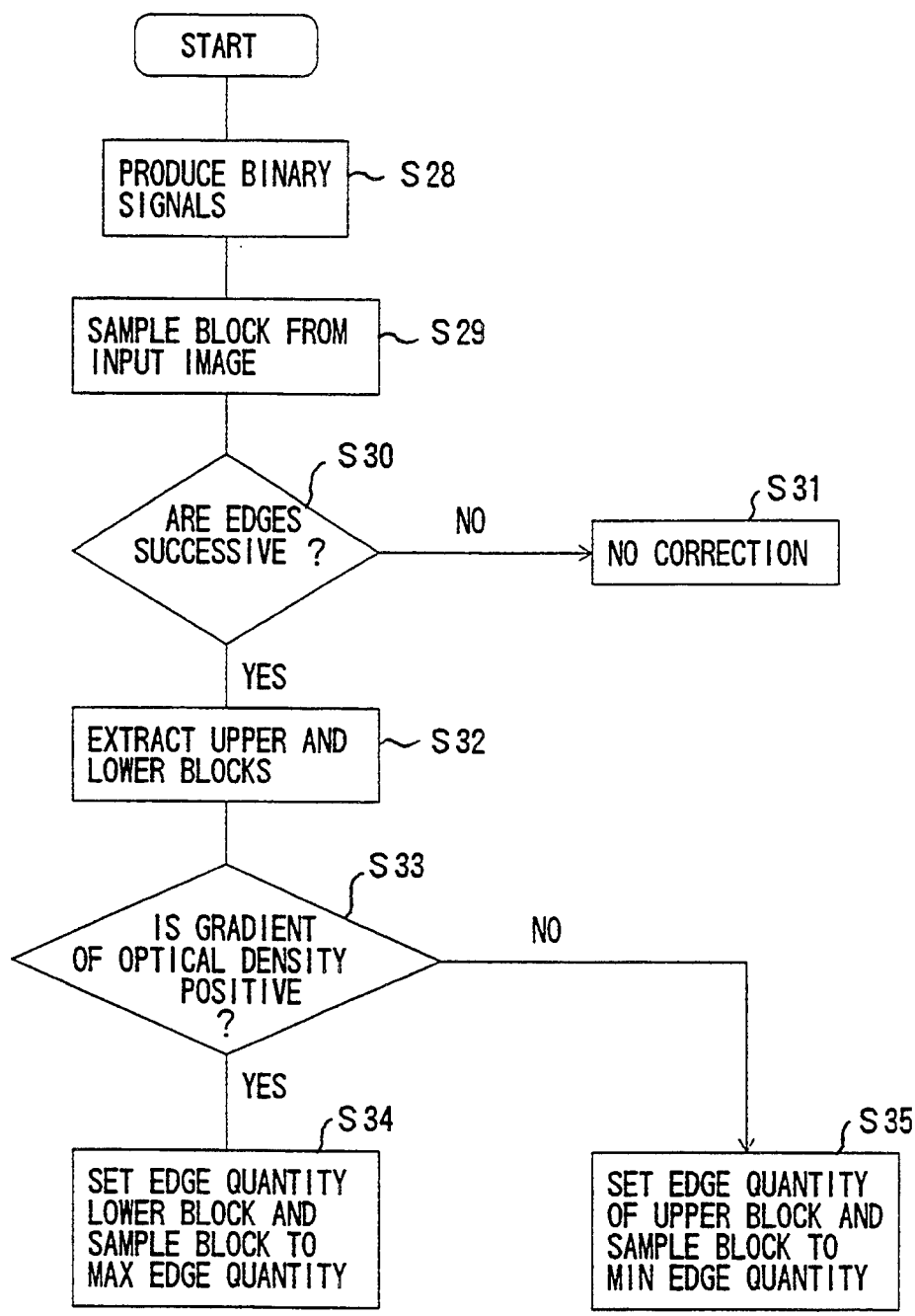

FIG. 15 shows another modified edge quantity correcting process according to the present invention. In FIG. 15, steps S28–31 of the edge quantity correcting process are the same as the corresponding steps S23–S25 and S27 shown in FIG. 14. If the answer to step S30 is negative, step S31 does not correct the edge quantity. If the answer to the step S30 is affirmative, step S32 extracts upper and lower blocks, contiguous to the sample block, from the input image. Step S33 detects whether or not the gradient of optical density at the pixel has a positive value by comparing the image data D0 of the sample block with the respective image data of the upper and lower blocks. If the answer to step S33 is affirmative (that is, if the gradient of optical density has a positive value), step S34 sets the edge quantity of each of the pixels of the lower block and the sample block to the maximum edge quantity (e.g., "255" for 8-bit image data). If the answer to step S33 is negative (that is, if the gradient of optical density has a negative value), step S35 sets the edge quantity of each of the pixels of the upper block and the sample block to the minimum edge quantity (e.g., "0"). If the edge quantity correcting process shown in FIG. 15 is performed, the edge quantity is corrected such that a region with a higher optical density has sharper edges.

FIG. 16 shows a matrix of coefficients of a differential filter used by an edge quantity corrector according to the present invention to detect whether or not the gradient of optical density has a positive value. This differential filter is used in a case in which a block of successive pixels arranged in the main scanning direction is sampled.

FIG. 17 shows a matrix of coefficients of a differential filter used by an edge quantity corrector according to the present invention in order to detect whether the gradient of optical density has a positive value in a case in which a block of successive pixels is arranged in the sub scanning direction (perpendicular to the main scanning direction). In addition, in order to sharpen the edges of an inclined image having a gradient at a certain angle to the main scanning direction, a block of a two-dimensional matrix from the input image is sampled and a differential filter appropriate for detecting the gradient of optical density of such an inclined image is used.

Further, the present invention is not limited to the above described embodiments, and variations and modifications may be made without departing from the scope of the present invention.

What is claimed is:

1. An image processing apparatus comprising:
   reading means for providing an input image signal by optically reading an input image from an original document;
   first filtering means for outputting a first image signal by processing said input image signal through an edge sharpening filter;
   second filtering means for outputting a second image signal by processing said input image signal through a smoothing filter;
   detecting means for detecting an edge quantity of said input image signal;
   correcting means for outputting a first edge quantity by correcting said edge quantity detected by said detecting means;
   mixing means for mixing said input image signal and said second image signal in accordance with a mixing factor, to provide a third image signal;
   mixing control means for determining the mixing factor in response to said first edge quantity output from said correcting means, and for supplying said mixing factor to said mixing means;
   first region detecting means coupled to said reading means for detecting whether or not a pixel indicated by the input image signal lies in a mesh region, and for outputting a detection signal indicating the result of said detection; and
   selecting means coupled to said first region detecting means for selecting one of the first image signal and the third image signal in accordance with said detection signal, and for supplying a selected image signal to the recording unit,
   whereby said recording unit reproduces an output image on a copy sheet in accordance with said selected image signal supplied from said selecting means.

2. An image processing apparatus comprising:
   reading means for providing an input image signal by optically reading an input image from an original document;
   first filtering means for outputting a first image signal by processing said input image signal through an edge sharpening filter;
   second filtering means for outputting a second image signal by processing said input image signal through a smoothing filter;
   detecting means for detecting an edge quantity of said input image signal;
   correcting means for outputting a first edge quantity by correcting said edge quantity detected by said detecting means;
   mixing means for mixing said input image signal and said second image signal in accordance with a mixing factor, to provide a third image signal;
   mixing control means for determining the mixing factor in response to said first edge quantity output from said correcting means, and for supplying said mixing factor to said mixing means;
   first region detecting means coupled to said correcting means for detecting whether or not a pixel indicated by the input image signal lies in an edge region, and for outputting a first detection signal indicating the result of said detection; and
   selecting means coupled to said first region detecting means for selecting one of the first image signal, the second image signal, and the third image signal in accordance with said first detection signal, and for supplying a selected image signal to the recording unit,
   whereby said recording unit reproduces an output image on a copy sheet in accordance with said selected signal supplied from said selecting means.

3. An image processing apparatus according to claim 2, further comprising:
   second region detecting means coupled to said reading means for detecting whether or not a pixel indicated by the input image signal lies in a mesh region, and for outputting a second detection signal indicating the result of said detection, wherein said selecting means selects one of the first image signal and the third image signal, in accordance with said first and second detection signals, to supply said selected image signal to the recording unit.

4. An image processing apparatus according to claim 2, further comprising:

second region detecting means coupled to said reading means for detecting whether or not a pixel indicated by the input image signal lies in a white region, and for outputting a second detection signal indicating the result of said detection, wherein said selecting means selects one of the first image signal and the third image signal, in accordance with said first and second detection signals, to supply said selected image signal to the recording unit.

5. An image processing apparatus according to claim 4, further comprising:

third region detecting means coupled to said reading means for detecting whether or not a pixel indicated by the input image signal lies in a mesh region, and for outputting a third detection signal indicating the result of said detection, wherein said selecting means selects one of the first image signal and the third image signal, in accordance with said first, second, and third detection signals, to supply said selected image signal to the recording unit.

6. An image processing apparatus comprising:

reading means for providing an input image signal by optically reading an input image from an original document;

first filtering means for outputting a first image signal by processing said input image signal through an edge sharpening filter;

second filtering means for outputting a second image signal by processing said input image signal through a smoothing filter;

detecting means for detecting an edge quantity of said input image signal;

correcting means for outputting a first edge quantity by correcting said edge quantity detected by said detecting means;

mixing means for mixing said input image signal and said second image signal in accordance with a mixing factor, to provide a third image signal;

mixing control means for determining the mixing factor in response to said first edge quantity output from said correcting means, and for supplying said mixing factor to said mixing means;

first region detecting means coupled to said reading means for detecting whether or not a pixel indicated by the input image signal lies in a white region, and for outputting a first detection signal indicating the result of said detection; and selecting means couples to said first region detecting means for selecting one of the first image signal, the second image signal, and the third image signal in accordance with said first detection signal, and for supplying said selected image signal to the recording unit, whereby said recording unit reproduces an output image on a copy sheet in accordance with said selected signal supplied from said selecting means.

7. An image processing apparatus according to claim 6, further comprising:

second region detecting means coupled to said reading means for detecting whether or not a pixel indicated by the input image signal lies in a mesh region, and for outputting a second detection signal indicating the result of said detection, wherein said selecting means selects one of the first image signal and the third image signal, in accordance with said first and second detection signals, to supply said selected image signal to the recording unit.

* * * * *